United States Patent [19]

Rannenberg

[11] 4,292,807

[45] Oct. 6, 1981

[54] VARIABLE GEOMETRY TURBOSUPERCHARGER SYSTEM FOR INTERNAL COMBUSTION ENGINE

[75] Inventor: George C. Rannenberg, Canton, Conn.

[73] Assignee: United Technologies Corporation, Hartford, Conn.

[21] Appl. No.: 35,185

[22] Filed: May 2, 1979

[51] Int. Cl.³ .............................................. F02B 37/12
[52] U.S. Cl. ....................................... 60/601; 415/158
[58] Field of Search .................. 60/600, 601, 602, 603, 60/611; 415/157, 158

[56] References Cited

U.S. PATENT DOCUMENTS

| | | | |
|---|---|---|---|
| 2,285,976 | 6/1942 | Huitson | 415/158 X |
| 2,355,759 | 8/1944 | Stokes | 60/600 |
| 2,437,546 | 3/1948 | Meripol | 60/600 X |
| 2,612,225 | 9/1952 | Sparrow | 60/602 X |
| 2,846,185 | 8/1958 | Widmer | 415/150 |
| 2,861,774 | 11/1958 | Buchi | 415/158 X |
| 2,996,996 | 8/1961 | Jassniker | 415/126 |
| 3,150,650 | 9/1964 | Dreesen et al. | 60/611 X |
| 3,233,403 | 2/1966 | MacInnes et al. | 60/600 |

FOREIGN PATENT DOCUMENTS

561932 6/1944 United Kingdom .................. 60/600

Primary Examiner—Michael Koczo, Jr.
Attorney, Agent, or Firm—John Swiatocha; Donald F. Bradley

[57] ABSTRACT

A turbosupercharging system for internal combustion engines, both otto cycle and diesel cycle, simultaneously varies the geometry of both the compressor discharge diffuser housing and the turbine inlet nozzle housing in a fixed relationship. The geometry variation is preferably accomplished by a single actuator which is positioned for optimum turbomachine geometry by a control responsive to selected engine parameters such as engine output torque demand and/or internal combustion engine volume flow. The variable geometry turbosupercharger effectively changes the size of the machine for varying engine operating conditions resulting in increased efficiency over the entire engine operating range.

18 Claims, 5 Drawing Figures

VARIABLE GEOMETRY TURBOSUPERCHARGER SYSTEM FOR INTERNAL COMBUSTION ENGINE

BACKGROUND OF THE INVENTION

1. Field of the Invention

This invention relates to exhaust gas driven turbosupercharger systems for internal combustion engines of either the otto cycle or diesel cycle type, and particularly to a turbosupercharger system for obtaining increased power from internal combustion engines by increasing the pressure of inlet air supplied to the engine. The invention contemplates the use of selected engine parameters for simultaneously varying the geometry of both the compressor discharge diffuser housing and the turbine inlet nozzle housing in order to, in effect, provide a turbosupercharger having a size matched to varying engine operating conditions.

2. Description of the Prior Art

The use of turbosuperchargers for compressing the air, or air-fuel mixture, to increase the brake horsepower output of internal combustion engines, has been known and practiced for many years. Turbosupercharging is advantageous since a naturally aspirated or unsupercharged engine is able to draw into the cylinders on suction strokes only from 70–85% of the fuel charge which it is theoretically capable of inducing. Consequently, the mean effective pressures are smaller than they might be, and the power output per in.$^3$ of piston displacement does not reach its maximum value. Since many engines were not structurally designed to withstand stresses created by cylinder pressures above atmospheric, turbosupercharging found its main utility in aircraft about the time of World War II where the turbosupercharger maintained the power of the engine up near its rated output at high altitudes.

Until recently sea-level gasoline engines have not often been turbosupercharged because they are most often of small capacities, and by operating at relatively high rotative speeds engine size may be kept small. Turbosupercharging these engines may create detonation problems without the use of special high-octane fuels. Diesels, however, are frequently turbosupercharged, permitting the burning of larger amounts of fuel without creating excessive combustion chamber temperatures.

The turbosupercharger is exhaust gas turbine-driven and consists basically of a single-stage turbine wheel directly connected to a compressor impeller. The engine exhaust is collected and led to the turbine inlet nozzle where it arrives at a pressure of several lbs./in.$^2$. Excess pressure ratio at high engine RPM across the nozzle of the turbosupercharger is typically controlled by releasing part of the exhaust to the atmosphere through a waste gate. A primary advantage of this type of turbosupercharging is that a part of the energy in the incompletely expanded exhaust gases is utilized rather than wasted. Gas expanding through the turbine nozzles to atmospheric pressure flows across the turbine blades, turning the turbine wheel. The compressor impeller, directly connected to the turbine, draws in air from the intake duct or carburetor, and adiabatically boosts it in pressure and temperature. Fuel is added either before or after pressurization of the air depending on the cycle. While the power necessary to drive the compressor is high, it is more than repaid by increased engine output. The compressor power required is a function of the pressure ratio, air temperature, and compressor efficiency.

In the past, turbosuperchargers were used with internal combustion engines for the explicit purpose of increasing power at high engine RPM, and were essentially useless and often disengaged at low engine RPM. Recently, due primarily to the necessity of conserving energy, turbosuperchargers have been designed for automotive gasoline engines which are advertised to perform smoothly through a broad range of driving conditions. These turbosuperchargers use broad flow rate compressors and a relatively small turbine inlet to provide some boost in power at low engine speeds. The turbosuperchargers are generally mounted between the carburetor and the intake manifold to minimize the inertial lag of the airflow.

A problem with turbosuperchargers of a fixed size is that they inherently cannot provide efficient boost over the entire range of internal combustion engine torque requirements. With fixed geometry compressors and turbines, the turbosupercharger will perform at its maximum efficiency at its design point, and will become less efficient to some degree as engine operation deviates from the design point. While somewhat of an oversimplification, a turbosupercharger designed to boost power at high RPM and volume flows will be large and will not perform efficiently at low RPM and volume flows, while a turbosupercharger designed to perform efficiently at low RPM and volume flows will be small and inadequate at high RPM and volume flows.

The usual solution is an intermediate sized turbosupercharger which has the power wasteage of an open wastegate valve at high RPM, and is too large to give much boost at low RPM, but which is relatively efficient for intermediate engine power conditions.

A solution to this dilemma is a variable geometry turbosupercharger, that is, one in which the effective size varies with engine airflow and engine torque requirements. A turbosupercharger in which the major active components, the compressor and tubine, can be varied with changing engine demands will provide the most efficient operation possible over the full engine operating range. A slight weight penalty and complexity of operation will result, but these undesirable results will be more than overriden by the fuel economy of greater efficiency. In effect, a variable geometry turbosupercharger will act like a small turbosupercharger at low engine power and RPM, and like a large turbosupercharger at high engine power and RPM. The variable geometry components of the disclosed turbosupercharger are not actually the compressor and turbine wheels, but rather the compressor discharge diffuser and the turbine inlet nozzle. Varying the geometry of these elements will effectively create a turbosupercharger which acts, over a range of operation, like a fully variable device.

It is known in the art to vary the inlet housing of a turbine in order to vary turbine flow versus pressure drop characteristics. The turbine inlet housing may be varied in cross-sectional flow area by moving a wall of the turbine nozzle housing, or by rotating the angle of nozzle vanes in the inlet housing if the housing is of the vaned type.

Although less well known than variable turbine inlet housings, it is also known to vary the discharge housing of a radial compressor to regulate its flow versus pressure rise characteristics. A compressor outlet diffuser housing may be varied in cross-sectional flow area in a manner similar to turbines, i.e., by moving a wall of the compressor outlet diffuser housing, or by rotating the angle of the diffuser vanes if the outlet housing is of the vaned type. Moving the vanes at the inlet of a radial compressor, as performed by the prior art for varying compressor geometry, rather than moving the outlet vanes, is not pertinent to the present invention since modulation of inlet vanes cannot change the flow characteristics of the compressor without adversely reducing its pressure rise characteristic. In other words, the prior art modulation of compressor inlet vanes drops pressure output at the same time that it reduces flow. Reduced pressure output destroys the turbosupercharging performance.

Turbosuperchargers for internal combustion engines in the past have utilized variable geometry turbine inlet housings with a variety of control schemes. Some turbosuperchargers have also utilized variable geometry compressor inlet housings, which as described above do not accomplish the object of the present invention. Because of the lack of effective compressor geometry change schemes used in the past, a practical fully-variable geometry turbosupercharger system has not been available prior to the present invention.

While not analogous to internal combustion engine or turbosupercharger technology, an air cycle environmental control system providing cooling air to aircraft enclosures has been designed incorporating movable turbine nozzles and movable compressor diffuser vanes. When implemented in a bootstrap air cycle machine, improved efficiencies over airflow ranges of 4:1 were achieved, twice that achievable with prior air cycle machines. Details of the system may be found in ASME Report #77 ENAS-7, July 11, 1977 in an article entitled "Variable Geometry Air Cycle Machine" by J. Tseka and G. C. Letton, Jr.

It is therefore an object of this invention to provide a variable geometry turbosupercharging system for an internal combustion engine which is highly efficient and provides significantly more engine output torque on demand over a wider range of engine speeds than prior art internal combustion engine turbosupercharging systems.

Another object of this invention is to provide a variable geometry turbosupercharging system for an internal combustion engine in which the compressor discharge diffuser and turbine inlet nozzle are simultaneously varied in area as a function of engine requirements to produce an efficient match between the engine and the turbosupercharger.

A further object of this invention is to provide a variable geometry turbosupercharging system for an internal combustion engine which is mechanically simple and in which the variable geometry function is produced by mechanically linking both the variable turbine inlet geometry and the variable compressor outlet diffuser geometry to a single actuator.

Another object of this invention is a control for varying the geometry of a turbosupercharger turbine inlet and compressor outlet housings over the full range of operating conditions of an internal combustion engine to provide the optimum match between the pressure and volume flow output of the compressor and the pressure and volume flow input requirements of the internal combustion engine.

A further object of this invention is a variable geometry turbosupercharger for internal combustion engines in which the turbosupercharger may be effectively removed from operation during periods of low torque demand by the engine, and in which turbine inlet pressure is controlled to prevent excessive compressor discharge pressure during periods of high torque demand.

SUMMARY OF THE INVENTION

In a preferred embodiment of this invention, internal combustion engines of the otto or diesel cycle types utilize a turbosupercharger to enhance performance. The turbosupercharger is configured whereby the geometries of both the compressor discharge diffuser housing and the turbine inlet nozzle housing are variable in a fixed relationship in response to selected engine operating parameters. A single actuator is used to vary the geometries of both components simultaneously. The actuator is moved by a pneumatic or hydraulic controller responsive to a parameter such as throttle valve position, which is indicative of engine torque demand, and/or to a parameter such as exhaust manifold pressure, which is indicative of engine RPM and airflow for any given turbine nozzle area. At low engine torque demand, the turbosuperacharger is configured in its "large" capacity mode in which the compressor discharge and turbine inlet housings are wide open permitting the engine to operate as though no turbosupercharger were present. As engine torque demand increases, the compressor discharge and turbine inlet housings are automatically made smaller by means of this invention to provide increased airflow pressure to the engine and increase its power output. To prevent to turbosupercharger geometry from becoming too small at high engine RPM, which could result in excessive turbosupercharger speed or excessive compressor discharge pressure, the controller senses turbine inlet pressure, and when it has reached a predetermined limit the turbosupercharger actuator moves the turbine and compressor housings back toward the "large" capacity mode, thereby setting a minimum limit on turbosupercharger size at high engine RPM. Varying the effective size of the turbosupercharger increases the engine efficiency over the entire operating range, and in particular considerably increases the surge margin at low speeds while preventing choking at high speeds.

For diesel engines fuel injector or accelerator pedal position may be used to indicate engine torque demand rather than intake manifold vacuum as in otto cycle engines.

For applications where boost is desired continuously regardless of power lever position, the size of the turbosupercharger may be modulated to provide an essentially constant turbine inlet pressure. A wastegate may be provided to protect against excessive pressures in the event of a failure in the "small" capacity position of the variable geometry actuator.

DESCRIPTION OF THE PREFERRED EMBODIMENT

It has been found that for a fixed geometry turbosupercharger for internal combustion engines designed for optimum efficiency at a preselected speed or power condition, at operational speeds differing from the design point a limited airflow range is available between the point of compressor surge and the choked condition where no more flow can pass. As operating conditions move away from the surge line, compressor efficiency drops off quickly. The same size turbosupercharger equipped with a variable turbine nozzle and a variable compressor diffuser increases the airflow range by 3 to 4 times that of the equivalent sized fixed geometry machine. The resulting broad efficiency bands permit more operation in the high efficiency areas. While a variable geometry machine adds some additional weight and complexity to the turbosupercharger, it is more than offset by increases in efficiency and decreased fuel consumption.

Figure 1:
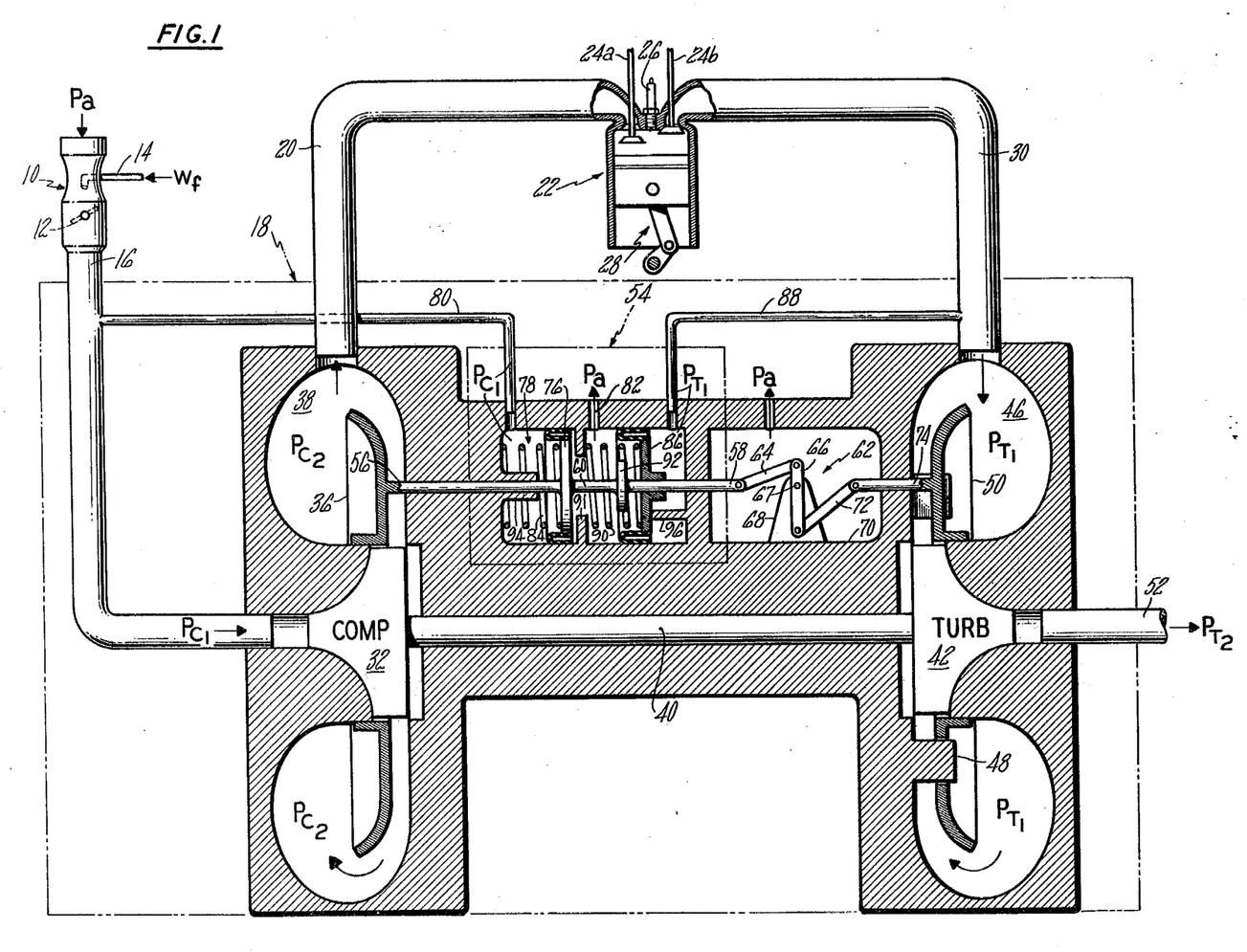
FIG. 1 is a schematic drawing of a variable geometry turbosupercharger system for an internal combustion engine of the otto cycle type having a pneumatic controller utilizing signals related to engine airflow and torque demand.
Figure 2:
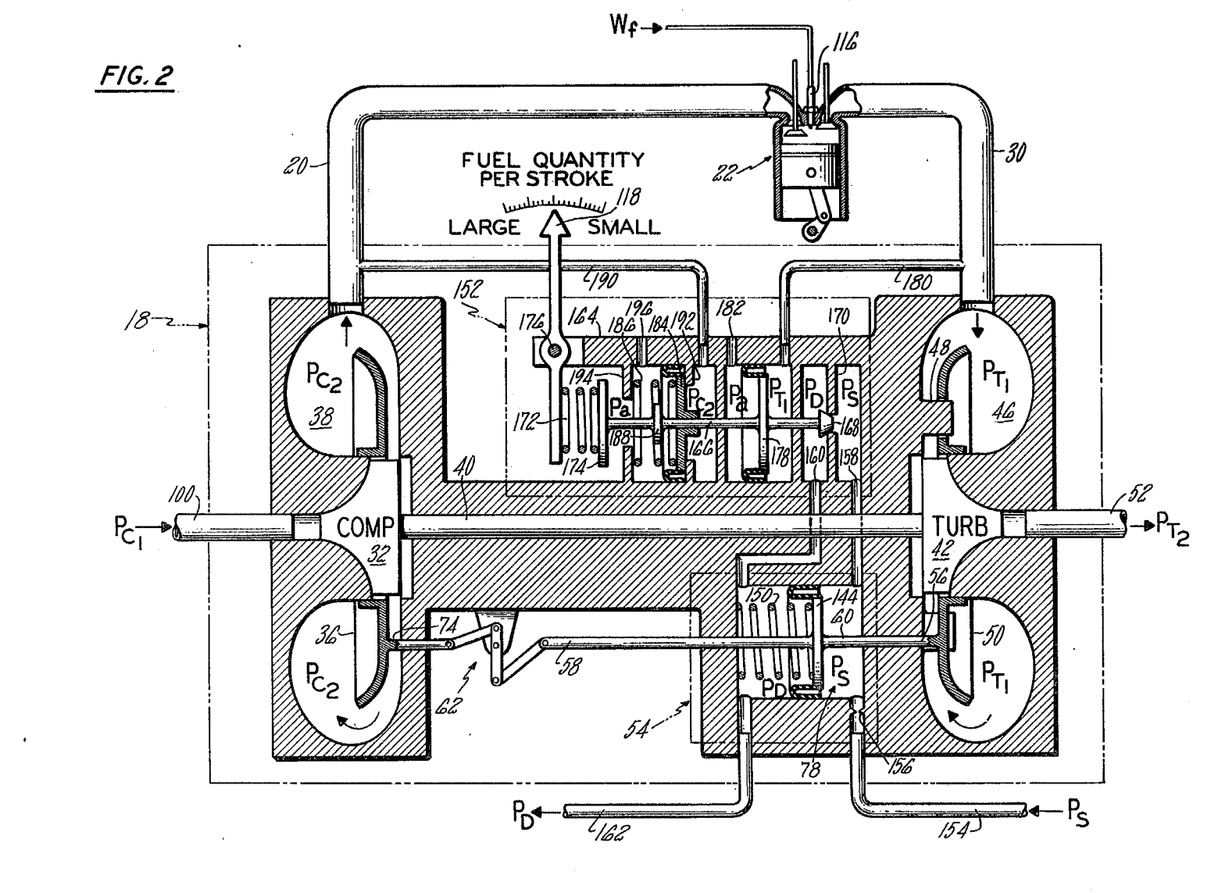
FIG. 2 is a schematic drawing of a variable geometry turbosupercharger system for an internal combustion engine of the diesel cycle type having a controller with a pressurized oil source utilizing signals related to engine airflow, torque demand, and compressor discharge pressure.
Figure 3:
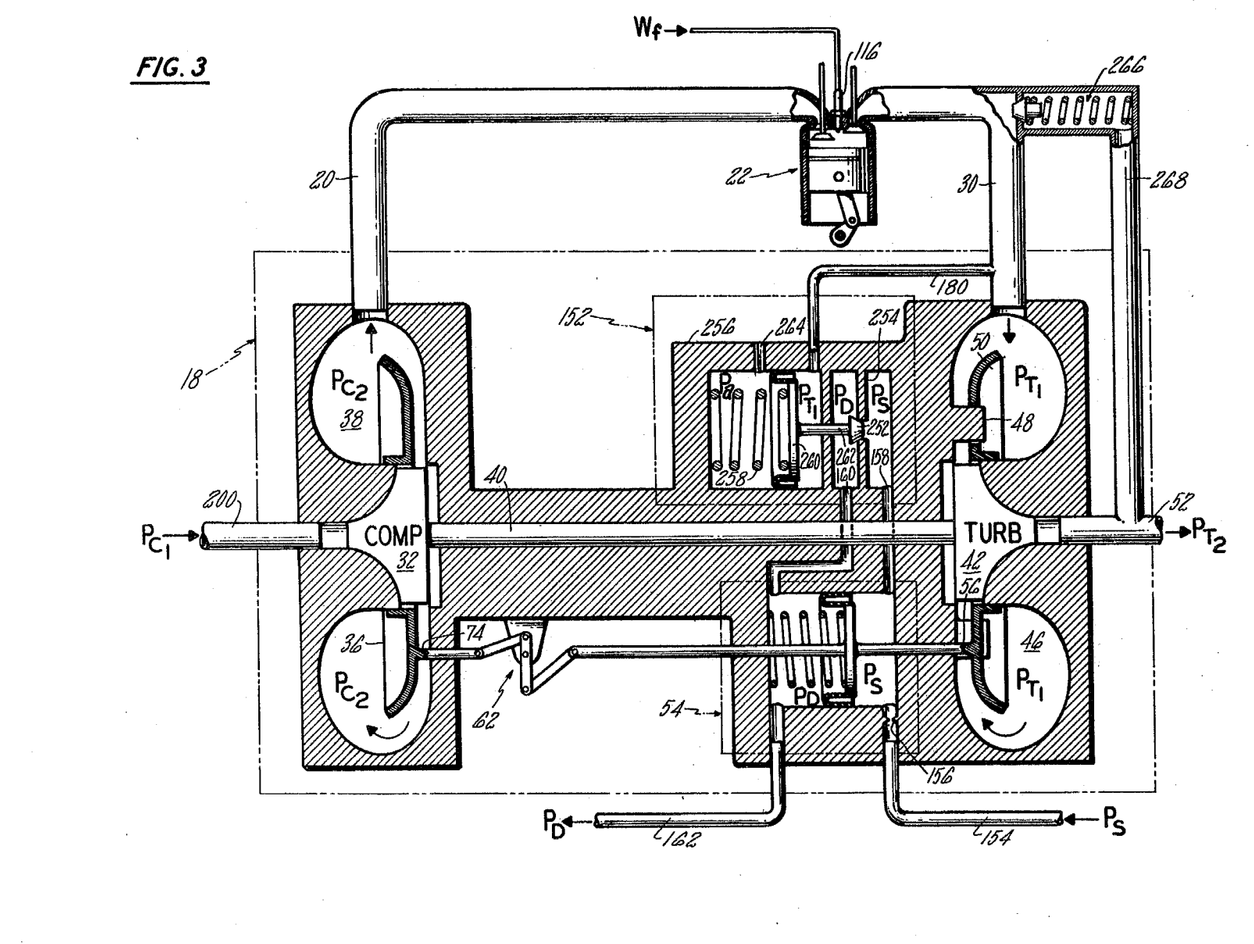
FIG. 3 is a schematic drawing of a variable geometry turbosupercharger system similar to FIG. 2 except utilizing only a signal related to engine airflow for control, without regard for torque demand or compressor discharge pressure.

Preferred embodiments of a variable geometry turbosupercharger for internal combustion engines of either the otto or diesel cycle are described with respect to FIGS. 1-3. The three embodiments differ in construction, but have the following common elements: the embodiments all relate to an internal combustion engine utilizing a turbosupercharger for enhancing engine performance; the turbosupercharger has a variable turbine inlet nozzle housing and a variable compressor discharge diffuser housing; the variable turbine inlet housing is varied with the position of a member such that the effective nozzle area at the entrance to the turbine blades is modulated in response to the member; the variable compressor discharge housing is varied with the position of a member such that the effective diffuser area at the exit of the compressor blades is modulated in response to the member; the variable turbine inlet geometry member and the variable compressor outlet geometry member are mechanically linked to each other and to a single actuator, the motion of which effectively changes the flow capacity of the turbosupercharger; and the single actuator is positioned by control signals in response to engine parameters selected so that the combined internal combustion engine and turbosupercharger system operates in the manner best suited for the intended use of the engine. The preferred turbosupercharger control preferably varies the actuator positioning, and therefore the effective turbosupercharger size, in response to a signal indicative of internal combustion engine air volume flow, which is related to engine RPM, or in response to two signals, one of which is indicative of internal combustion engine air volume flow, and the other of which is indicative of engine torque demand. Overrides are provided in the control to prevent the actuator from selecting a turbomachine so small that an excessively high turbine inlet or compressor outlet pressure is produced, which in turn could cause excessive stresses on engine components.

Referring to FIG. 1 there is shown a preferred embodiment of the present inventiohn which is applicable to internal combustion engines of the otto cycle type, the engine including a carburetor 10 having an inlet throttle valve 12, by adjustment of which the mixture of fuel, $W_f$, with the air supply, $P_a$, is controlled. The fuel is supplied via a venturi 14 located in the duct 16 leading from the atmosphere to the engine cylinders. The process of vaporizing and mixing of a liquid fuel with air in the correct proportion for otto cycle engines is well known and does not form a part of the present invention.

The fuel-air mixture is fed from duct 16 via the turbosupercharger system, shown by dashed lines in block 18 and to be described in detail, to an engine intake manifold 20 where the mixture is distributed to one or more cylinders shown generally at 22 and which contain intake and exhaust valves 24a and 24b respectively, a spark plug 26, a piston and crankshaft assembly 28, and an exhaust manifold 30. These elements are also well known and do not form a part of the invention.

In accordance with the present invention, the engine air-flow, or the fuel-air mixture for the implementation of FIG. 1, is fed via duct 16 to the inlet of a compressor 32 which is part of the turbosupercharger system 18, the compressor inlet pressure being denoted $P_{C1}$. It should be noted that the elements of this invention are unaffected if the fuel addition occurs downstream of the compressor rather than upstream thereof as described in FIG. 1. After a rise in the pressure of the fuel-air mixture induced by rotation of the compressor rotor, the compressed fuel-air mixture is then discharged from the compressor via movable diffuser wall member 36 into the compressor discharge housing 38 and then into the engine intake manifold 20. The compressor discharge pressure is denoted $P_{C2}$. The compressor 32 is connected via a shaft 40 to a turbine 42, the turbine rotor being driven by the engine exhaust gases fed into the turbine housing via exhaust manifold 30 and turbine inlet housing 46, the inlet housing 46 containing a vaned nozzle section comprising stationary fixed angle vanes 48 protruding through a movable wall member 50 whereby the flow capacity of the turbine is varied by motion of wall member 50 which changes the inlet area of the turbine nozzle. The turbine inlet pressure, equivalent to the exhaust manifold pressure is denoted $P_{T1}$, and the turbine outlet pressure, fed from the turbine to the engine exhaust via a duct 52, is denoted $P_{T2}$. The flow capacity of the compressor is regulated by movement of diffuser wall member 36 and the pressure drop across the turbine is regulated by movement of nozzle wall member 50.

While the effective diffuser area of the compressor discharge housing 38 is shown in FIG. 1 as consisting of a vaneless diffuser varied in capacity by movable wall member 36 of the diffuser, there are other equivalent means for varying the effective diffuser area of the compressor discharge housing, for example, the addition of vanes, and/or mechanically varying the angle of the diffuser vanes. Any equivalent means for varying the diffuser geometry of the compressor discharge are within the scope of this invention. Likewise, while the effective nozzle area of the turbine inlet housing 46 is shown in FIG. 1 as consisting of a vaned nozzle section comprising stationary fixed angle vanes 48 protruding through movable wall member 50 with vanes 48 being equally spaced circumferentially about housing 46, any other equivalent means for varying the effective nozzle area of the turbine inlet housing are within the scope of this invention; such means include but are not limited to mechanically varying the angle of the nozzle vanes, or elimination of the nozzle vanes to form a vaneless turbine nozzle assembly whose wall is moved. In the latter case the effective nozzle area is preferably varied by motion of one of the nozzle walls, including the alternative of moving a flexible wall.

Movement of wall members 36 and 50 in the compressor outlet housing 38 and turbine inlet housing 46 respectively is controlled by an actuator assembly 54 shown enclosed by dashed lines as part of the turbosupercharger system 18. Both wall members are moved simultaneously by the actuator 54 in the same relative direction and in a fixed relationship, i.e., movement in one direction will simultaneously increase the cross-sectional flow area of the compressor discharge diffuser and turbine inlet nozzle, and movement in the other direction will simultaneously decrease the cross-sectional flow area of both components. The amount of movement of both wall members 36 and 50 is in a fixed relationship but not necessarily equal or linear, and is determined by the desired relative sizes of the compressor 32 and turbine 42 and the size of the internal combustion engine, as well as to other system variables, and must be determined empirically. Briefly, however, it is desired to vary the effective size of the turbocompressor, i.e., the pressure rise across the compressor and pressure drop across the turbine, to match the desired engine operation, taking into account such variables as engine size, RPM, torque, fuel conservation, smoke in the case of a diesel engine, etc. In general, at engine idle the wall members 36 and 50 are at the "large" capacity turbosupercharger position whereby there is little or no restriction to airflow, and in effect the turbosupercharger is bypassed. As engine RPM increases, and with it engine torque demand, as may be indicated by pressing down the accelerator pedal in an automobile, the turbosupercharger is moved to a "smaller" capacity position, providing an increased pressure rise across the compressor, and using the pressure from the engine exhaust to drive the turbine. The actual physical movement of the wall members 36 and 50 is designed to permit the compressor to operate as close as possible to its surge line for highest efficiency whenever maximum torque is demanded. As engine RPM is increased, however, to prevent excessive compressor discharge pressure and choking of the flow paths, a limit is placed on the minimum turbocompressor size, and once this limit is reached the geometry is moved away from the "small" capacity turbosupercharger position to provide maximum allowable power boost from the turbosupercharger system.

Referring again to FIG. 1, the position of wall member 36 is determined by the position of translatable member 56, and the position of wall member 50 is determined by the position of translatable member 58, both members 56 and 58 being connected to and moved in response to movement of driving member 60 of actuator 54. Member 56 is directly connected to movable wall member 36, while member 58 is connected to movable wall member 50 via a bellcrank and lever assembly generally indicated at 62 and which includes arm 64 hinged to the end of member 58 and to one end of arm 66. Arm 66 is affixed via pivot 67 to rotate about a fixed member 68 which is attached to a support 70. The opposite end of arm 66 is hinged to one end of an arm 72, the opposite end of arm 72 being hinged to a member 74 fixedly attached to wall member 50. Lever assembly 62 is exemplary and may be replaced with other equivalent means for moving wall member 50. Likewise, similar mechanical, hydraulic or other devices may be interposed between member 56 and movable wall member 36.

Driving member 60 of actuator 54 has connected thereto a piston 76, the piston and driving member being enclosed in a chamber generally shown at 78. One side of the piston 76 is exposed to compressor inlet pressure via fluid duct 80, while the other side of the piston is exposed to ambient pressure via opening 82. A spring 84 forces the piston 76 to the right, i.e., in a direction to reduce the cross-sectional area of the compressor discharge diffuser and turbine inlet nozzle by moving wall members 36 and 50, thereby resulting in a "smaller" capacity turbosupercharger. When the engine is at idle or at a low RPM, and low torque demand such as may be produced by only a slight depression of the accelerator pedal in an automobile, a relatively high vacuum exists in duct 16 downstream of throttle valve 12, which pressure is transmitted via duct 80 to the left side of piston 76. The ambient pressure, $P_a$, on the right side of piston 76 is greater than $P_{C1}$ under these conditions, and is sufficiently high to force the piston to the left, overcoming the force of spring 84, thereby moving the wall members 36 and 50 to a high cross-sectional area condition for the compressor discharge diffuser and turbine inlet nozzle, i.e., toward the "large" capacity turbosupercharger. Thus during periods of low torque demand, the turbosupercharger will rotate very slowly and permit the internal combustion engine to operate in essentially the same manner as if it did not have a turbosupercharger. This operational mode is quite desirable in some otto cycle engine installations from the standpoint of reduced fuel consumption and reduced noise at part throttle operation. The precise geometric configuration will, of course, depend on the particular engine operating characteristics and the amount of turbosupercharging desired, and it is apparent that the force of spring 84 can be adjusted to select the precise conditions whereby the turbosupercharger geometry is controlled to a desired schedule.

As engine torque demand is increased, the pressure $P_{C1}$ gradually increases with opening of throttle valve 12, and this pressure increase is transmitted to chamber 78 via duct 80 forcing piston 76 to the right and gradually moving wall members 36 and 50 toward the "small" capacity turbosupercharger configuration and increasing the pressure rise of the fuel-air mixture through the compressor 32. At the same time the turbine inlet pressure $P_{T1}$ is increasing, causing the turbine 42 to rotate the compressor rotor 34 at a higher speed. To prevent the turbosupercharger geometry from becoming too "small" at high engine RPM's and torque demand which could result in choking and/or excessive speeds and excessive compressor discharge pressure, a second piston 86 is located in enclosure 78 circumferentially about and movable relative to driving member 60. On the left side of piston 85 is ambient pressure, $P_a$, while the right side of piston 86 is exposed to turbine inlet pressure, $P_{T1}$, via duct 88. A spring 90 supported at one end by a flange 91 and under compression pushes piston 86 to the right until the pressure $P_{T1}$ on the right-hand side of piston 86 reaches a value which overcomes the resistance of spring 90 and moves piston 86 to the left.

As piston 86 moves to the left it presses against a circumferential flange 92 fixedly attached to driving member 60 and pushes driving member 60 toward the "large" capacity turbosupercharger. In this manner the minimum size limit of the turbosupercharger is varied with increased volume flow through the internal combustion engine, since as engine RPM and therefore volume flow increase, the geometry of the turbosupercharger is increased to permit greater flow by the action of piston 86 which acts as a turbine inlet pressure, $P_{T1}$, limiter to open the turbine nozzle area and hold the value of turbine inlet pressure scheduled by spring 90. Likewise as engine RPM is decreased, the geometry of the turbosupercharger is also decreased by the action of piston 86 which, as turbine inlet pressure decreases, reduces its force toward the "large" capacity turbosupercharger and permits spring 84 to force driving member 60 toward the "small" capacity turbosupercharger.

Lands 94 and 96 located in enclosure 78 set limits on the maximum and minimum capacities of the turbosupercharger by limiting movement of pistons 76 and 86.

FIG. 2 shows another embodiment of the present invention applicable specifically to internal combustion engines of the diesel cycle. The embodiment of FIG. 2 differs from that of FIG. 1 in the following respects: a pressurized oil source is used for actuator servo pressure rather than compressor or turbine inlet pressure, however the choice of oil to produce the servo power is not related to diesel versus otto cycles, but is a designer's choice dependent on speed of system response for the control and on other control performance variables. It is illustrative as an alternative to pneumatic pressures; the signal utilized for a measure of engine torque demand is either fuel injected per stroke, or accelerator pedal position, rather than intake manifold vacuum; and a maximum compressor discharge pressure override on turbosupercharger size is utilized to drive the machine to a larger size to prevent the machine from exceeding a maximum selected compressor discharge pressure to prevent undue engine stress, or detonation in the case of the otto cycle.

Referring to FIG. 2, where reference numerals identical to FIG. 1 will be used for like elements, ambient air is directed to the engine via inlet pipe 100 and fed directly to compressor 32 located within the turbosupercharger system 18 shown by the dashed lines. The air is increased in pressure by rotation of the compressor rotor and then fed to the engine cylinder 22 via compressor discharge housing 38, containing movable diffuser wall member 36, and intake manifold 20. The engine cylinder 22 is that of a diesel cycle engine cylinder, containing intake and exhaust valves, and a piston and crankcase assembly, in which the spark plug of the otto cycle has been replaced by a fuel injection nozzle 116 through which a quantity of fuel, $W_f$, is sprayed at the end of each compression cycle. Also, diesel engines do not have a carburetor and throttle valve. The fuel input is generally governed by control of the fuel pump, not shown, more or less fuel being delivered per stroke, depending on the torque demand. Air injection in which the fuel is blown in and atomized by a high pressure air jet may also be used. Control of the fuel input, specifically the fuel quantity per stroke, is shown as an adjustable control lever 118 which can be varied by the operator between fixed limits. In most applications the lever 118 is manually adjustable by the operator, and is equivalent to the accelerator pedal in an automobile which is connected to the fuel pump, movement of the accelerator pedal varying the quantity of fuel per stroke to regulate engine torque.

The combustion products from cylinder 22 are passed through exhaust manifold 30 and into the turbine inlet housing 46 which is part of the turbosupercharger system 18. The housing 46 contains a variable nozzle as in FIG. 1 composed of stationary vanes 48 protruding through a movable wall member 50, the nozzle being varied in flow capacity by movement of wall member 50. The fluid at the turbine inlet passes through the nozzle and into turbine 42, the turbine rotor being connected to the compressor rotor via shaft 40. As the exhaust gases pass through the turbine nozzle and impinge on the turbine rotor, work is performed and rotational energy imparted to the turbine rotor and in turn to the compressor rotor. The exhaust gases are then returned to atmosphere, preferably through a pollution control system, via duct 52.

The geometry of the variable compressor diffuser is determined by the position of wall member 36 which is in turn determined by the position of member 58. Likewise the geometry of the variable turbine nozzle is determined by the position of movable wall member 50, which is in turn determined by the position of member 56. Both members 56 and 58 are connected to the driving member 60 of actuator assembly 54 shown in dashed lines. Driving member 60 has attached thereto a piston 144 and is enclosed in chamber 78. Member 58 is connected to movable diffuser wall member 36 through bellcrank and lever assembly 62. The piston 144 of actuator assembly 54 is pushed toward the "large" capacity turbosupercharger by a spring 150 in chamber 78. Piston 144 is driven against the force of spring 150 by servo supply pressure as regulated by a controller assembly 152 shown enclosed in dashed lines. The servo pressure may be pressurized hydraulic fluid such as oil at a pressure $P_s$, and fed from a source, not shown, via line 154 through an orifice 156 to chamber 78 where it produces a pressure on the right-hand side of piston 144. The pressurized fluid is then directed via a duct 158 to controller assembly 152 where, as will be described, a poppet valve is modulated as a function of fuel quantity and turbine inlet pressure to vary the servo pressure. A fluid drain duct 160 returns the fluid from controller assembly 152 into chamber 78 of actuator assembly 54 on the left side of piston 144 and from there via a duct 162 to drain.

The controller assembly 152 consists of an enclosure shown generally at 164 containing a plurality of chambers at different pressures, and a translatable driving member 166 which modulates a poppet valve. The poppet, shown at 168, seats on a circular opening in wall 170 in its closed position and prevents the pressurized hydraulic fluid from flowing to drain. As the poppet 168 moves to the left, the valve opens and the hydraulic fluid is able to pass through the opening to drain via duct 160. When the poppet 168 is open, the fluid drops in pressure due to its flow through orifice 156. Thus, opening and closing the poppet regulates the pressure from the source $P_S$, on the right side of piston 144 in actuator assembly 54, and this variation in pressure, in conjunction with the force applied to piston 144 by spring 150, causes translation of driving member 60 and resultant movement of movable wall members 36 and 50.

Translatable driving member 166 pushes poppet 168 toward a closed position in response to the force of a spring 172 pushing against a flange 174 at the left-hand end of driving member 166. The force of spring 172 is responsive to and variable with the position of lever 118. The lever 118 acts as a fulcrum pivotable about pivot rod 176 supported by the enclosure 164 whereby movement of lever 118, such as by pressing the accelerator pedal of an automotive vehicle, increases the spring force on driving member 166 when a larger fuel quantity per stroke is demanded, and decreases the spring force when a smaller fuel quantity per stroke is demanded. In essence, a larger fuel quantity per stroke means higher engine RPM and torque, and the increased spring force tends to close poppet 168 increasing the fluid pressure on the right side of piston 144 which moves wall members 36 and 50 toward the "small" capacity position. Conversely, a small fuel quantity per stroke means lower engine RPM and torque, and the decreased spring force tends to open poppet 168 decreasing the fluid pressure on the right side of piston 144 moving wall members 36 and 50 toward the "large" capacity position.

The minimum size of the turbosupercharger is determined by the value of turbine inlet pressure, $P_{T1}$. As the turbosupercharger becomes smaller, the speed of rotation of the turbocompressor increases, and damage could result at excessively high speeds. Consequently, as $P_{T1}$ increases beyond the value selected by spring 172, action is taken to reduce $P_{T1}$ by opening poppet 168. To accomplish this, a piston 178 is fixedly connected to driving member 166, with the turbine inlet pressure $P_{T1}$ being fed via duct 180 to the right side of piston 178, and ambient pressure $P_a$ being admitted to the left side of piston 178 via vent 182. As pressure $P_{T1}$ increases to a value sufficient to overcome the force of spring 172, piston 178 and driving member 166 are moved to the left to open poppet 168 and move wall members 36 and 50 toward the "large" capacity position. In effect, piston 178 regulates maximum turbine inlet pressure to the value determined by spring 172.

A piston 184 is mounted on driving member 166, the piston being movable relative to the driving member, and urged to the right, against inwardly extending flange 192 mounted on the wall of enclosure 164, by a compression spring 186. The left end of the spring abuts flange 194 also extending inwardly from the wall of enclosure 164. Compressor discharge pressure, $P_{C2}$, is fed to the chamber on the right of piston 184 by duct 190, and ambient pressure is fed to the left side of piston 184 via a vent 196. A flange 188 is fixed to driving member 166 to the left of the piston 184. Spring 186 is selected to provide a force equivalent to a predetermined compressor discharge pressure. When the compressor discharge pressure on the right of piston 184 exceeds the value determined by the force of spring 186, piston 184 moves to the left and pushes against flange 188 tending to force driving member 166 to the left and opening poppet 168, thereby reducing the pressure to the right of piston 144 of actuator assembly 54 and moving wall members 36 and 50 toward the "large" capacity position. In effect, piston 184 drives member 166 to regulate maximum compressor discharge pressure to the value determined by the force of spring 186.

It should be noted that the limiting function performed in the embodiment of FIG. 1 in response to turbine inlet pressure, $P_{T1}$, could instead be performed in response to compressor discharge pressure, $P_{C2}$, as in FIG. 2, with only minor modifications. In both embodiments the control parameter selected, while considered the best mode, could be replaced by another representative parameter since a predictable relationship exists between accelerator pedal or throttle position, fuel flow quantity, engine RPM, engine torque, compressor inlet pressure in otto cycle engines, compressor discharge pressure, and turbine inlet pressure. Turbine outlet pressure has a less direct relationship to engine operation and is not presently considered a viable control parameter. Other parameters such as airflow volume and certain velocities and/or temperatures may also be used, the only criterion being some predictable relationship between the control parameter and engine/turbosupercharger system operation.

In the embodiments of FIGS. 1 and 2, the turbosupercharger is varied in speed as a function of torque demand, having a low RPM at low engine speeds and low torque demand where the supercharger is effectively inoperative, and a high RPM at high engine speeds and high torque demand. This mode of operation has certain advantages, one being reduced noise at low engine speeds, and, according to some reports, lower pollution also. A disadvantage is that a time lag occurs when torque demand is increased, such as by depressing the accelerator pedal, while the turbosupercharger increases its rotational velocity. In some applications, particularly for a diesel engine where boost may be desired continuously regardless of power lever position, the embodiment of FIG. 3 may be more desirable.

Referring to FIG. 3, air is fed via line 200 at a pressure $P_{C1}$ to compressor 32 of turbosupercharger system 18, the compressor rotor directing the air through the movable diffuser wall member 36 in compressor discharge housing 38 and then via intake manifold 20 to cylinder 22. Fuel, $W_f$, is supplied to cylinder 22 via nozzle 116. The combustion products from cylinder 22 are passed via exhaust manifold 30 to turbine inlet housing 46 having stationary vanes 48 protruding through a movable wall member 50 to form a nozzle, and into turbine 42 to produce rotation of the turbine rotor which is connected via shaft 40 to drive the compressor rotor. The turbine exhaust passes to atmosphere via duct 52. The actuator assembly 54 for moving wall members 36 and 50, including bellcrank and lever assembly 62, pressurized fluid supplied via line 154, orifice 156 and drain line 162 are identical to FIG. 2. Controller assembly 152 is connected to actuator assembly 54 via servo pressure duct 158 and drain duct 160 and to exhaust manifold 30 via duct 180.

Controller assembly 152 contains a poppet 252 which regulates servo fluid flow from line 158 through an opening in wall 254 of enclosure 256, poppet 252 being seated to close the opening when forced to the right by the force of a spring 258 acting against piston 260, the piston being connected to poppet 252 via driving member 262. Ambient pressure is admitted to the left side of piston 260 via vent 264, while turbine inlet pressure $P_{T1}$ is admitted to the right side of piston 260 via duct 180.

In operation, the size of the turbosupercharger is modulated by moving wall members 36 and 50 to provide a relatively constant turbine inlet pressure as determined by the force of spring 258. When turbine inlet pressure sensed by duct 180 is higher than that set by spring 258, piston 260 is moved to the left, opening poppet 252 to lower the servo pressure in duct 158 which causes actuator assembly 54 to move wall members 36 and 50 toward a "larger" capacity turbosupercharger. When turbine inlet pressure is low, poppet 252 closes to raise servo pressure in duct 158 causing the turbosupercharger to be moved toward a "smaller" capacity configuration.

Also shown in FIG. 3 is a turbine pressure bypass valve 266 commonly used with turbosupercharged internal combustion engines and known as a "wastegate", and which may be used with the turbosupercharger system of this invention to protect the engine in the event of a failure in the "small" capacity position of the variable geometry turbosupercharger mechanism. In this case when the pressure $P_{T1}$ increases above a limit selected by normally closed valve 266, the valve will open bypassing the excess combustion products via duct 268 to atmosphere through a junction with duct 52.

In each of the embodiments described, the geometry of one of the nozzles is fixed relative to the other i.e., there is always a fixed mechanical relationship between the compressor discharge diffuser and the turbine inlet nozzle. The amount of movement of both wall members 36 and 50 is shown in a non-equal non-linear relationship in the implementations of FIGS. 1, 2 and 3 because such a relationship is usually preferable from a performance point of view. However the amount of movement of both members 36 and 50 can be made both equal and linear by eliminating lever assembly 62 and connecting elements 56 and 74 directly to actuator assembly 54. When lever assembly 62 is eliminated, one of the movable walls, either 36 or 50, must be moved to the opposite side of its flow passage in order that the turbine nozzle area and compressor diffuser area decrease together, and conversely that the two areas increase together with motion of actuator assembly 54. The relationship is not necessarily linear, and may be adjusted empirically by changes in the mechanics during design and/or development of a specific system. The mechanical adjustment of the variable geometry walls, described in the disclosed embodiments due to its simplicity and reliability, may alternatively be performed by electronic actuators. In the latter case, two actuators may be used, one for each movable wall member or its equivalent, and scheduled independently by a control such as a microprocessor responsive to selected input parameters in the manner of turbine engine controls. Electronics, however, are subject to vibration, contamination and heat in the engine environment, and may be less reliable and more costly than the mechanical embodiments described herein.

Figure 4:
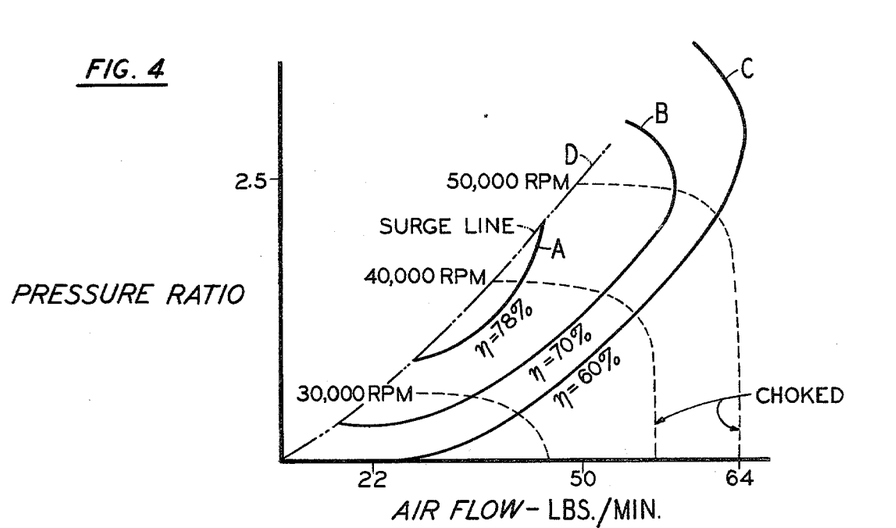
FIG. 4 is a chart showing typical performance for the compressor of a fixed geometry turbosupercharger.
Figure 5:
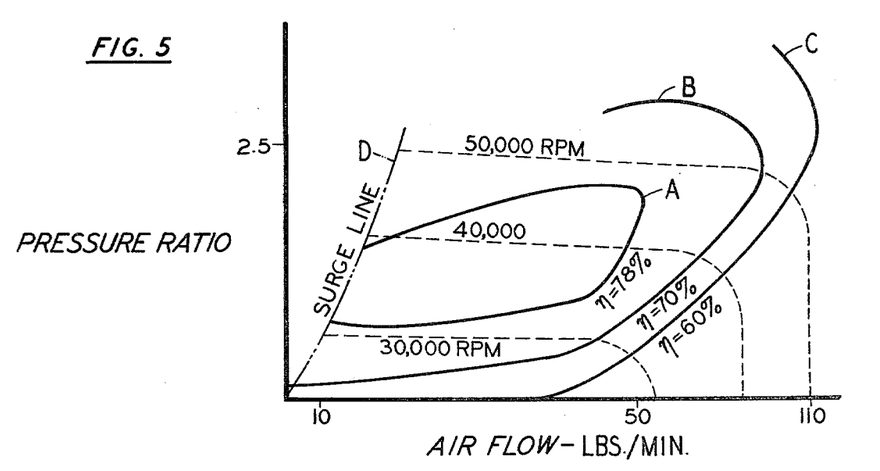
FIG. 5 is a chart showing typical performance for the compressor of a variable geometry turbosupercharger.

FIGS. 4 and 5 are charts showing typical compressor performance maps for fixed and variable geometry turbosuperchargers respectively. The maps show the relationship between compressor pressure ratio and airflow for various compressor speeds, and have superimposed thereon lines A, B and C denoting efficiencies, $\eta$, of 78%, 70% and 60% respectively. In FIG. 4, at any given compressor speed, a limited airflow range of only about 20 lb./min. is available between the point of compressor surge, line D, and the choked condition where no more flow can pass. Also, it is noted that as operating conditions move away from the surge line, compressor efficiency drops off quickly.

The same compressor rotor, but re-equipped with movable compressor diffuser vanes produces the performance represented in FIG. 5. The variable geometry flow range of FIG. 5 has increased to about 65 lb./min., which is 3 to 4 times that of the fixed geometry machine of FIG. 4. It is the broad efficiency bands A, B, and C of FIG. 5 which permit more operation in the high efficiency areas for the disclosed turbosupercharger system.

Although the invention has been described with respect to preferred embodiments thereof, and in the best mode presently contemplated, it is apparent that changes may be made to the design, construction and operation thereof without departing from the scope of the invention as hereinafter claimed.

I claim:

1. In a turbosupercharger system for an internal combustion engine, said turbosupercharger including a compressor having an outlet diffuser and a turbine having an inlet nozzle, said turbine being driven by exhaust gases from said engine and being connected to drive said compressor to raise the pressure of air supplied to said engine;
   means including a first movable member connected to said compressor outlet diffuser and adapted to vary the geometry thereof such that the effective diffuser area at the exit of said compressor is varied in response to said first member;
   means including a second movable member connected to said turbine inlet nozzle and adapted to vary the geometry thereof such that the effective turbine nozzle area at the inlet to said turbine is varied in response to said second member;
   means for sensing a condition of operation of said engine and producing a signal indicative thereof;
   and actuator means connected to said first and second movable members and responsive to said signal for simultaneously moving said members and thereby varying the geometry of said compressor outlet diffuser and said turbine inlet nozzle in a fixed geometrical relationship.

2. A turbosupercharger system as in claim 1 in which said actuator means is a single actuator mechanically connected to said first and second movable members.

3. A turbosupercharger system as in claim 1 in which said means for sensing a condition of operation of said engine comprises means for sensing the pressure of the engine exhaust gases used to drive said turbine at the inlet to said turbine and producing a pressure signal indicative thereof, said actuator means being responsive to said pressure signal for varying the geometry of said compressor outlet diffuser and said turbine inlet nozzle to maintain a preselected exhaust gas pressure at the inlet to said turbine.

4. A turbosupercharger system as in claim 3 and including means for producing a signal indicative of desired engine torque;
   and means responsive to said desired engine torque signal for varying said preselected exhaust gas pressure at the inlet of said turbine whereby said preselected gas pressure is increased with increases in desired engine torque and decreased with decreases in desired engine torque.

5. A turbosupercharger system as in claim 4 in which said internal combustion engine includes a variable engine torque selector means, and whereby said means for producing a signal indicative of desired engine torque includes means responsive to the position of said engine power selector means.

6. A turbosupercharger system as in claim 5 in which said internal combustion engine includes a carburetor having a throttle valve, said desired engine torque signal being produced in response to the position of said throttle valve.

7. A turbosupercharger system as in claim 5 in which said internal combustion engine includes a carburetor for mixing air and fuel at a pressure less than atmospheric and feeding said mixture to said engine, said desired engine power signal being produced in response to said pressure.

8. A turbosupercharger system as in claim 5 in which said internal combustion engine includes at least one cylinder and a fuel injection means for injecting fuel into said cylinder, said desired engine torque signal being produced as a function of the quantity of fuel injected per engine revolution into said cylinder.

9. A turbosupercharger system as in claim 1 in which said means for sensing a condition of operation of said engine comprises means for sensing the pressure of the air supplied to said engine at the outlet of said compressor and producing a pressure signal indicative thereof, said actuator means being responsive to said pressure signal for varying the geometry of said compressor outlet diffuser and said turbine inlet nozzle to maintain a preselected air pressure at the outlet of said compressor.

10. A turbosupercharger system as in claim 1 and including means for producing a signal indicative of desired engine torque;

and means responsive to said desired engine torque signal for varying said preselected air pressure at the outlet of said compressor whereby said preselected air pressure is increased with increases in desired engine torque and decreased with decreases in desired engine torque.

11. A turbosupercharger system as in claim 10 in which said internal combustion engine includes a variable engine torque selector means, and whereby said means for producing a signal indicative of desired engine torque includes means responsive to the position of said engine torque selector means.

12. A turbosupercharger system as in claim 10 in which said internal combustion engine includes a carburetor having a throttle valve, said desired engine torque signal being produced in response to the position of said throttle valve.

13. A turbosupercharger system as in claim 10 in which said internal combustion engine includes a carburetor for mixing air and fuel at a pressure less than atmospheric and feeding said mixture to said engine, said desired engine torque signal being produced in response to said pressure.

14. A turbosupercharger system as in claim 10 in which said internal combustion engine includes at least one cylinder and a fuel injection means for injecting fuel into said cylinder, said desired engine torque signal being produced as a function of the volume of fuel injected per engine revolution into said cylinder.

15. A turbosupercharger system as in claim 1 in which said compressor outlet diffuser includes a movable wall connected with said first movable member and movable therewith for varying the diffuser area at the exit of said compressor.

16. A turbosupercharger system as in claim 1 in which said turbine inlet nozzle contains a plurality of stationary fixed angle vanes spaced about said turbine and protruding through a movable wall, said movable wall being connected with said second movable member and movable therewith for varying the nozzle area at the inlet of said turbine.

17. A turbosupercharger system as in claim 1 in which said actuator means includes an enclosure;

a first piston means in said enclosure and connected to said first and second movable members whereby movement of said first piston in one direction increases the effective compressor diffuser and turbine nozzle areas and movement of the first piston in the other direction decreases the effective compressor diffuser and turbine nozzle areas;

spring means in said enclosure adapted to move said first piston in the direction to decrease said compressor diffuser and turbine nozzle areas;

means responsive to a signal indicative of engine power demand for moving said first piston means in the direction of increased compressor diffuser and turbine nozzle areas when said engine torque demand is low and in the direction of decreased compressor diffuser and turbine nozzle areas when said engine torque demand is high;

and second piston means in said enclosure responsive to the pressure at the inlet of said turbine for moving said first piston means in the direction to increase the compressor diffuser and turbine nozzle areas when said turbine inlet pressure exceeds a predetermined value.

18. A turbosupercharger system as in claim 1 in which said actuator means includes an enclosure;

a piston means in said enclosure and connected to said first and second movable members whereby movement of said piston means in one direction increases the effective compressor diffuser and turbine nozzle areas and movement of said piston means in the other direction decreases the effective compressor diffuser and turbine nozzle areas;

spring means in said enclosure adapted to move said piston in the direction to increase said compressor diffuser and turbine nozzle areas;

means responsive to a signal indicative of engine power demand for moving said piston means in the direction of increased compressor diffuser and turbine nozzle areas when said engine torque demand is low and in the direction of decreased compressor diffuser and turbine nozzle areas when said engine torque demand is high;

and means responsive to a compressor outlet or a turbine inlet pressure above a preselected value for moving said piston means in the direction to increase the respective compressor diffuser or turbine nozzle area.

* * * * *

UNITED STATES PATENT AND TRADEMARK OFFICE
CERTIFICATE OF CORRECTION

PATENT NO. : 4,292,807

DATED : October 6, 1981

INVENTOR(S) : George C. Rannenberg

It is certified that error appears in the above—identified patent and that said Letters Patent is hereby corrected as shown below:

Column 2, line 40, "tubine" should be --turbine--.

Column 4, line 31, "to" (second occurrence) should be --the--.

Column 6, line 4, "inventiohn" should be --invention--.

Column 8, line 62, "85" should be --86--.

Signed and Sealed this

Thirteenth Day of April 1982

[SEAL]

Attest:

Attesting Officer

GERALD J. MOSSINGHOFF

Commissioner of Patents and Trademarks